United States Patent
Hayami

(10) Patent No.: US 10,744,410 B2
(45) Date of Patent: Aug. 18, 2020

(54) STORAGE MEDIUM, INFORMATION PROCESSING APPARATUS, IMAGE PROCESSING METHOD, AND INFORMATION PROCESSING SYSTEM

(71) Applicant: NINTENDO CO., LTD., Kyoto (JP)

(72) Inventor: Shun Hayami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 20 days.

(21) Appl. No.: 15/685,017

(22) Filed: Aug. 24, 2017

(65) Prior Publication Data
US 2019/0060754 A1 Feb. 28, 2019

(51) Int. Cl.
| A63F 13/56 | (2014.01) |
| A63F 13/57 | (2014.01) |
| A63F 13/525 | (2014.01) |
| G06T 1/60 | (2006.01) |
| G06T 15/20 | (2011.01) |
| G06T 19/00 | (2011.01) |
| G06T 15/00 | (2011.01) |

(52) U.S. Cl.
CPC ........... A63F 13/525 (2014.09); A63F 13/56 (2014.09); A63F 13/57 (2014.09); G06T 1/60 (2013.01); G06T 15/005 (2013.01); G06T 15/20 (2013.01); G06T 19/003 (2013.01)

(58) Field of Classification Search
CPC .................................. G06T 17/00; G06T 7/30
See application file for complete search history.

(56) References Cited

U.S. PATENT DOCUMENTS

| 6,155,926 A * | 12/2000 | Miyamoto | A63F 13/02 463/32 |
| 2003/0117405 A1* | 6/2003 | Hubrecht | G06T 17/00 345/543 |
| 2009/0066690 A1* | 3/2009 | Harrison | G06T 19/006 345/419 |
| 2018/0089942 A1* | 3/2018 | Filipour | G07F 17/3267 |

OTHER PUBLICATIONS

Super Mario 64 game manual, Nintendo, 1996 (Year: 1996).*
YouTube video of Super Mario 64 gameplay, "Super Mario 64 Full Playthrough (120 Stars + Yoshi bonus area)", 2011, https://www.youtube.com/watch?v=XnqGFn0Byg4 (Year: 2011).*

* cited by examiner

*Primary Examiner* — Damon J Pierce
(74) *Attorney, Agent, or Firm* — Nixon & Vanderyhe PC

(57) ABSTRACT

This storage medium is a non-transitory storage medium storing an image processing program that can be read by a computer of an information processing apparatus. The image processing program causes a computer to execute steps of: controlling a virtual camera in a virtual space; and reading out, from the storage medium, an object, among objects recorded in the storage medium as objects present in the virtual space, that on the basis of at least a distance from the virtual camera is newly selected as the virtual camera moves, and holding the object in memory of the computer.

23 Claims, 13 Drawing Sheets

STORAGE MEDIUM, INFORMATION PROCESSING APPARATUS, IMAGE PROCESSING METHOD, AND INFORMATION PROCESSING SYSTEM

TECHNICAL FIELD

The present invention relates to a storage medium, an information processing apparatus, an image processing method, and an information processing system.

BACKGROUND ART

In various types of game devices, when playing a game, the usable memory space may become insufficient as the game progresses. This can interfere with the progress of the game. For example, when too many objects appear in a single game screen, there is a problem in that the memory cannot store the required data and the game cannot progress.

SUMMARY OF THE INVENTION

Accordingly, to reduce the amount of memory used, a method has been proposed in which instead of loading all of the data for objects appearing the game into the memory, the data of an object is loaded into the memory only when the position of the object in a virtual space is within a predetermined range from a reference position. Using a physics engine in a game to calculate the physical behavior of an object as necessary and display that behavior in a game has also been proposed.

However, if an object in a virtual space is arranged in a physically unstable state (a state where the object may exhibit behavior such as falling or sliding), the object may be displayed as being in the unstable state upon the position of the object entering the predetermined range. In such a case, the physics engine will calculate the behavior of the object on the basis of the unstable state, and the behavior during the transition from the unstable state to a stable state will be displayed. If the behavior is displayed in such a manner, the object may fall or slide immediately after being displayed despite the player not doing anything, and the player who views this may experience a sense of unnaturalness.

Such problems are not limited to games, and can arise in various types of applications such as simulations. The present invention has been conceived in order to solve such problems, and an object of the present invention is to provide a storage medium, an information processing apparatus, an image processing method, and an information processing system capable of preventing an object to be displayed from being displayed in an unstable state.

A storage medium according to a first aspect is a non-transitory storage medium storing an image processing program that can be read by a computer of an information processing apparatus with at least one memory, the image processing program causing a computer to execute: a virtual camera control step of controlling a virtual camera in a virtual space; an object arrangement step of reading out, from the storage medium, an object, among objects recorded in the storage medium as objects present in the virtual space, that on the basis of at least a distance from the virtual camera is newly selected as the virtual camera moves, holding the object in the memory, and newly arranging the object in the virtual space; a physics computation step of calculating physical behavior of the object in the virtual space and updating a position of the object; a determination step of determining whether or not the object newly arranged in the object arrangement step is in an unstable state on the basis of the physical behavior of the object immediately after the object is arranged in the virtual space, the unstable state being a state in which the object moves; a display target object setting step of setting the object newly arranged in the object arrangement step to be displayed at a predetermined timing after the arrangement, and furthermore, in the case where the newly-arranged object has been determined in the determination step to be in an unstable state, setting the newly-arranged object to be displayed at a timing later than the predetermined timing; and a rendering processing step of generating an image of the virtual space including the object to be displayed on the basis of the virtual camera.

According to this configuration, in the case where it is determined that during the game, a target object will be in a physically unstable state immediately after that target object is arranged in the virtual space, the timing from when the object is arranged to when the object is displayed is set to a later timing. The following effects can be achieved as a result. The position of the object in a physically unstable state is updated to a position in which the object will be in a physically stable state as a result of the step of updating the position of the object. However, when the object is to be displayed, if the behavior of the object during this update is displayed, the object will appear unnatural. To prevent this, in the present invention, the timing at which the object is to be displayed is delayed so that the object is displayed after the physical behavior of the object is substantially complete and the object is in a physically stable state. As a result, the physical behavior of the object is substantially complete by the time the object is to be displayed, which makes it possible to prevent an unnatural display in which the physical behavior of the object appears in the display.

Note that "updating the position of the object" in the above-described step of updating the position of the object can also include updating the orientation and direction of the object.

A storage medium according to a second aspect is the storage medium according to the first aspect, wherein at least an initial position of each object is stored in the storage medium as information of the objects; the object arrangement step arranges the newly-arranged object in the virtual space in the initial position of the object; the image processing program further causes the computer to execute an object state control step of changing and storing a state of the objects in the virtual space; and in the case where a supporting object in a positional relationship of supporting the newly-arranged object is stored in the storage medium and the supporting object is not present in the initial position in the object state control step, the determination step determines that the newly-arranged object is in the unstable state.

In other words, a variety of states are conceivable as unstable states for the object. For example, in the case where the target object is supported by a supporting object, the target object is once again arranged in the virtual space after the supporting object disappears. In this case, the supporting objects has disappeared, and thus the target object falls downward in the step of updating the position of the object. Accordingly, if the object is displayed at the later timing as described above, the unnaturalness of the object suddenly dropping when the object is displayed can be eliminated.

A storage medium according to a third aspect is the storage medium according to the second aspect, wherein the image processing program further causes the computer to execute a game processing step of controlling a player character on the basis of an operation carried out by a player;

in the case where a process of removing an object is carried out in the game processing step, the object state control step causes information indicating that the object has disappeared to be stored; and in the case where the supporting object supporting the newly-arranged object has disappeared, the determination step determines that the newly-arranged object is in the unstable state.

A storage medium according to a fourth aspect is the storage medium according to the second aspect, wherein the supporting object and the newly-arranged object are in a stacked state, the stacked state being a state in which the supporting object is arranged below the newly-arranged object in the virtual space and a downward physical force acts at point of contact between the supporting object and the newly-arranged object.

A storage medium according to a fifth aspect is the storage medium according to the second aspect, wherein the newly-arranged object being supported by the supporting object is stored in advance.

A storage medium according to a sixth aspect is the storage medium according to the fourth aspect, wherein the supporting object and the newly-arranged object being in the stacked state is stored in advance.

An information processing apparatus according to a seventh aspect includes at least one processor, at least one memory; and a non-transitory storage medium storing at least one image processing program. The image processing program causes the processor to execute: a virtual camera control step of controlling a virtual camera in a virtual space; an object arrangement step of reading out, from the storage medium, an object, among objects recorded in the storage medium as objects present in the virtual space, that on the basis of at least a distance from the virtual camera is newly selected as the virtual camera moves, holding the object in the memory, and newly arranging the object in the virtual space; a physics computation step of calculating physical behavior of the object in the virtual space and updating a position of the object; a determination step of determining whether or not the object newly arranged in the object arrangement step is in an unstable state on the basis of the physical behavior of the object immediately after the object is arranged in the virtual space, the unstable state being a state in which the object moves; a display target object setting step of setting the object newly arranged in the object arrangement step to be displayed at a predetermined timing after the arrangement, and furthermore, in the case where the newly-arranged object has been determined in the determination step to be in an unstable state, setting the newly-arranged object to be displayed at a timing later than the predetermined timing; and a rendering processing step of generating an image of the virtual space including the object to be displayed on the basis of the virtual camera.

An information processing apparatus according to an eighth aspect is the information processing apparatus according to the seventh aspect, wherein at least an initial position of each object is stored in the storage medium as information of the objects; the object arrangement step arranges the newly-arranged object in the virtual space in the initial position of the object; the image processing program further causes the computer to execute an object state control step of changing and storing a state of the objects in the virtual space; and in the case where a supporting object in a positional relationship of supporting the newly-arranged object is stored in the storage medium and the supporting object is not present in the initial position in the object state control step, the determination step determines that the newly-arranged object is in the unstable state.

An information processing apparatus according to a ninth aspect is the information processing apparatus according to the eighth aspect, wherein the image processing program further causes the computer to execute a game processing step of controlling a player character on the basis of an operation carried out by a player; in the case where a process of removing an object is carried out in the game processing step, the object state control step causes information indicating that the object has disappeared to be stored; and in the case where the supporting object supporting the newly-arranged object has disappeared, the determination step determines that the newly-arranged object is in the unstable state.

An information processing apparatus according to a tenth aspect is the information processing apparatus according to the eighth aspect, wherein the supporting object and the newly-arranged object are in a stacked state, the stacked state being a state in which the supporting object is arranged below the newly-arranged object in the virtual space and a downward physical force acts at point of contact between the supporting object and the newly-arranged object.

An information processing apparatus according to an eleventh aspect is the information processing apparatus according to the eighth aspect, wherein the newly-arranged object being supported by the supporting object is stored in advance.

An information processing apparatus according to a twelfth aspect is the information processing apparatus according to the eighth aspect, wherein the supporting object and the newly-arranged object being in the stacked state is stored in advance.

An image processing method according to a thirteenth aspect is an image processing method carried out by a computer of an information processing apparatus with at least one memory and a non-transitory storage medium, the method including: a virtual camera control step of controlling a virtual camera in a virtual space; an object arrangement step of reading out, from the storage medium, an object, among objects recorded in the storage medium as objects present in the virtual space, that on the basis of at least a distance from the virtual camera is newly selected as the virtual camera moves, holding the object in the memory, and newly arranging the object in the virtual space; a physics computation step of calculating physical behavior of the object in the virtual space and updating a position of the object; a determination step of determining whether or not the object newly arranged in the object arrangement step is in an unstable state on the basis of the physical behavior of the object immediately after the object is arranged in the virtual space, the unstable state being a state in which the object moves; a display target object setting step of setting the object newly arranged in the object arrangement step to be displayed at a predetermined timing after the arrangement, and furthermore, in the case where the newly-arranged object has been determined in the determination step to be in an unstable state, setting the newly-arranged object to be displayed at a timing later than the predetermined timing; and a rendering processing step of generating an image of the virtual space including the object to be displayed on the basis of the virtual camera.

An image processing method according to a fourteenth aspect is the image processing method according to the thirteenth aspect, wherein at least an initial position of each object is stored in the storage medium as information of the objects; the object arrangement step arranges the newly-arranged object in the virtual space in the initial position of the object; the method further includes an object state control step of changing and storing a state of the objects in the virtual space; and in the case where a supporting object in a positional relationship of supporting the newly-arranged object is stored in the storage medium and the supporting object is not present in the initial position in the object state control step, the determination step determines that the newly-arranged object is in the unstable state.

An image processing method according to a fifteenth aspect is the image processing method according to the fourteenth aspect, wherein the method further includes a game processing step of controlling a player character on the basis of an operation carried out by a player; in the case where a process of removing an object is carried out in the game processing step, the object state control step causes information indicating that the object has disappeared to be stored; and in the case where the supporting object supporting the newly-arranged object has disappeared, the determination step determines that the newly-arranged object is in the unstable state.

An image processing method according to a sixteenth aspect is the image processing method according to the fourteenth aspect, wherein the supporting object and the newly-arranged object are in a stacked state, the stacked state being a state in which the supporting object is arranged below the newly-arranged object in the virtual space and a downward physical force acts at point of contact between the supporting object and the newly-arranged object.

An image processing method according to a seventeenth aspect is the image processing method according to the sixteenth aspect, wherein the newly-arranged object being supported by the supporting object is stored in advance.

An image processing method according to an eighteenth aspect is the image processing method according to the sixteenth aspect, wherein the supporting object and the newly-arranged object being in the stacked state is stored in advance.

An information processing system according to a nineteenth aspect is an information processing system, the system including at least one processor, at least one memory, and a non-transitory storage medium storing at least one information processing program. The information processing program causes the processor to execute, a process of generating data of objects present in a virtual space, for at least some of the objects arranged in the virtual space, a process of, in the case where a first object is below a second object and at least makes contact with the second object, associating information indicating that the first object is supporting the second object with the first object and the second object and storing the information in the storage medium.

An information processing system according to a twentieth aspect is an information processing system, the system including at least one processor, at least one memory, and a non-transitory storage medium storing at least one information processing program. The information processing program causes the processor to execute, a process of generating data of objects present in a virtual space, for at least some of the objects arranged in the virtual space, a process of calculating physical behavior of the object and updating a position of the object until the object is still, and a process of updating the position of the object that has become still as the position of the object and storing the position in the storage medium.

EMBODIMENTS OF THE INVENTION

A. Game Device

An embodiment in which a storage medium storing an image processing program, an information processing apparatus, and an image processing method according to the present invention are applied in a game device will be described hereinafter with reference to the drawings. In the present embodiment, a role playing game will be given as an example of the game. An overview of the game device will be given first, and then the image processing program and image processing method will be described.

1. External Appearance of Game Device

Figure 1:
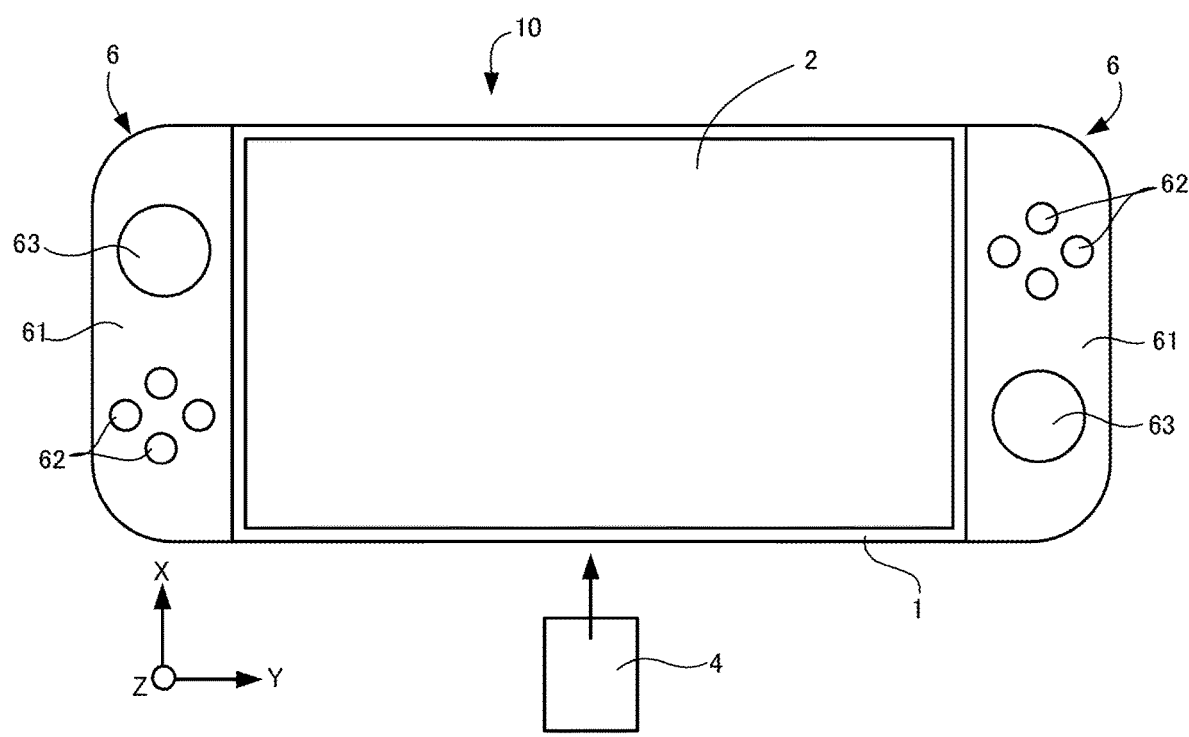
FIG. 1 is a perspective view illustrating the external appearance of a game device according to an embodiment of the present invention.

First, the external appearance of the game device will be described with reference to FIG. 1. FIG. 1 is a perspective view illustrating the external appearance of the game device. As illustrated in FIG. 1, this game device 10 includes a housing 1 that is rectangular when viewed in plan view and has a flat shape. A liquid crystal display (LCD) 2 that is rectangular in shape is provided across almost the entirety of a main surface of the housing 1. A touch panel 3 having substantially the same shape as the LCD 2 is provided across almost the entire surface of the LCD 2. The touch panel 3 used here is not particularly limited. Various types of touch panels may be employed, such as an electrostatic capacitance type, a resistive film type, a planar scatter detection type, and an ultrasonic type. Furthermore, in addition to a player's finger, the touch panel can be touched using a stylus as well. The touch panel 3 may be a single-touch type or a multitouch type.

A controller 6 is attached to both sides of the housing 1. Each controller 6 includes: a housing 61, rectangular when viewed in plan view, that can be gripped by hand; four operating buttons 62 arranged on a main surface of the housing 61, the main surface being on the same side as the main surface of the housing 1; and an analog stick 63 arranged on the main surface of the housing 61. The analog stick 63 is attached to the main surface of the housing 61 in a tiltable manner, and is capable of directional inputs and so on. A variety of game operations can be made using the analog stick 63 and the plurality of operating buttons 62. Means for carrying out game operations, including the analog stick 63 and the plurality of operating buttons 62 but not including the above-described touch panel 3, will be referred to hereinafter as operating means 65.

In addition, an insertion port (not illustrated) for inserting an external storage medium 4 is provided in the above-described housing 1. A connector (not illustrated) for electrically connecting the external storage medium 4 in a removable manner is provided inside the insertion port. Various devices such as a camera, a speaker, and a microphone can also be provided as necessary. In the case where game operations are carried out by voice, the microphone may be included in the above-described operating means 65.

2. Internal Configuration of Game Device

Figure 2:
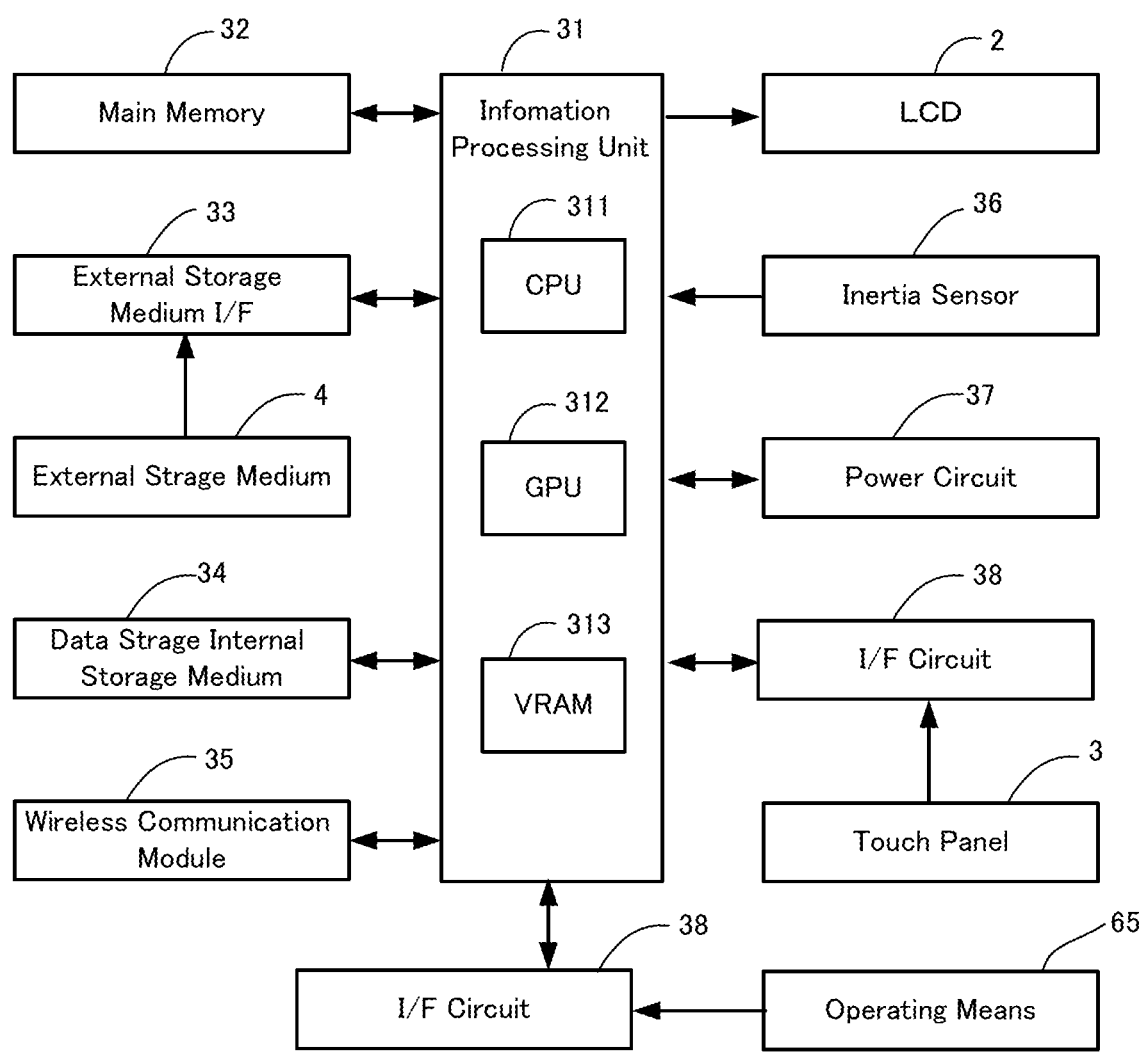
FIG. 2 is a block diagram illustrating the internal configuration of the game device illustrated in FIG. 1.

Next, the internal configuration of the game device 10 will be described with reference to FIG. 2. FIG. 2 is a block diagram illustrating the internal configuration of the game device 10. As illustrated in FIG. 2, the game device 10 includes an information processing unit (controller) 31 in addition to the elements illustrated in FIG. 1. Main memory 32, an external storage medium interface (external storage medium I/F) 33, a data storage internal storage medium 34, a wireless communication module (communication unit) 35, an inertia sensor 36, a power source circuit 37, and a plurality of interface circuits (I/F circuits) 38 are connected to the information processing unit 31. These electronic components are mounted on an electronic circuit board and housed within the housing 1. The above-described LCD 2 is also connected to the information processing unit 31.

The information processing unit 31 includes a central processing unit (CPU) 311 for executing predetermined programs, a graphics processing unit (GPU) 312 for image processing, video RAM (VRAM) 313, and so on. In the present embodiment, the predetermined programs are stored in a memory within the game device 10 (the external storage medium 4 connected to the external storage medium I/F 33 or the data storage internal storage medium 34, for example). By executing the predetermined programs, the CPU 311 of the information processing unit 31 carries out game processing, as well as various types of processes (image processing and so on) based on the game processing, which will be described later.

In the information processing unit 31, the GPU 312 generates images in response to commands from the CPU 311 and renders those images in the VRAM 313. The GPU 312 outputs the images rendered in the VRAM 313 to the LCD 2 connected to the information processing unit 31, and those images are displayed in the LCD 2.

The main memory 32 is a volatile storage means used as a working region for the CPU 311, a buffer region, and so on. In other words, the main memory 32 temporarily stores various types of data used in the above-described processes, programs obtained from the exterior (the external storage medium 4, other devices, or the like), and so on.

The external storage medium I/F 33 is an interface for connecting the external storage medium 4 in a removable manner. The external storage medium 4 is non-volatile storage means for storing programs to be executed by the information processing unit 31, and is constituted by read-only semiconductor memory, for example. Upon the external storage medium. 4 being connected to the external storage medium. I/F 33, the information processing unit 31 can read the programs stored in the external storage medium 4. Predetermined processes can then be carried out by the information processing unit 31 executing the read programs.

The data storage internal storage medium 34 is constituted by readable/writable non-volatile memory (NAND flash memory, for example), and is used to store predetermined data. For example, data and programs downloaded wirelessly using the wireless communication module 35 are stored in the data storage internal storage medium 34.

The wireless communication module 35 is a communication module that is Wi-Fi compliant, for example, and has a function for connecting to a wireless LAN through a method based on the IEEE 802.11 a/b/g/n/ac standard, for example. The information processing unit 31 can use the wireless communication module 35 to send and receive data to and from another game device, send and receive data to and from another device over the internet, and so on, as will be described later.

The wireless communication module 35 also has a function for communicating wirelessly when playing games among a plurality of game devices.

The inertia sensor 36 detects angular velocities around three axes (X, Y, and Z axes, in the present embodiment). At least one gyrosensor, accelerometer, or the like can be used as the inertia sensor 36, for example. In the case where a gyrosensor is used, the gyrosensor detects angular velocities around the axes with a short side direction of the housing 1 illustrated in FIG. 1 serving as the X axis, a long side direction serving as the Y axis, and a thickness direction (a direction perpendicular to the main surface) serving as the Z axis, for example. Data indicating the angular velocities detected by the inertia sensor 36 such as a gyrosensor, an accelerometer, or the like is sent to the information processing unit 31, and tilt of the housing 1 around the X, Y, and Z axes is then calculated.

The power source circuit 37 controls power from a power source (not illustrated) of the game device 10, and supplies power to the components of the game device 10.

The plurality of I/F circuits 38 are provided in the game device, and the I/F circuits 38 are connected to the touch panel 3 and the operating means 65, respectively. The I/F circuit 38 connected to the touch panel 3 includes a touch panel control circuit that controls the touch panel 3. The touch panel control circuit generates touch position data in a predetermined format on the basis of signals from the touch panel 3 and outputs the touch position data to the information processing unit 31. The touch position data expresses coordinates (touch information) of a position, in an input surface of the touch panel 3, where an input has been made. Note that the touch panel control circuit takes the signals from the touch panel 3 and generates the touch position data once every predetermined amount of time. By obtaining the touch position data, the information processing unit 31 can ascertain a position of the touch panel 3 where an input has been made.

Meanwhile, the I/F circuit 38 connected to the operating means 65 includes a control circuit that controls the operating means 65. The control circuit generates operation data in a predetermined format on the basis of signals from the operating means 65 and outputs the operation data to the information processing unit 31.

3. Example of Data Used in Game Processing

Figure 3:
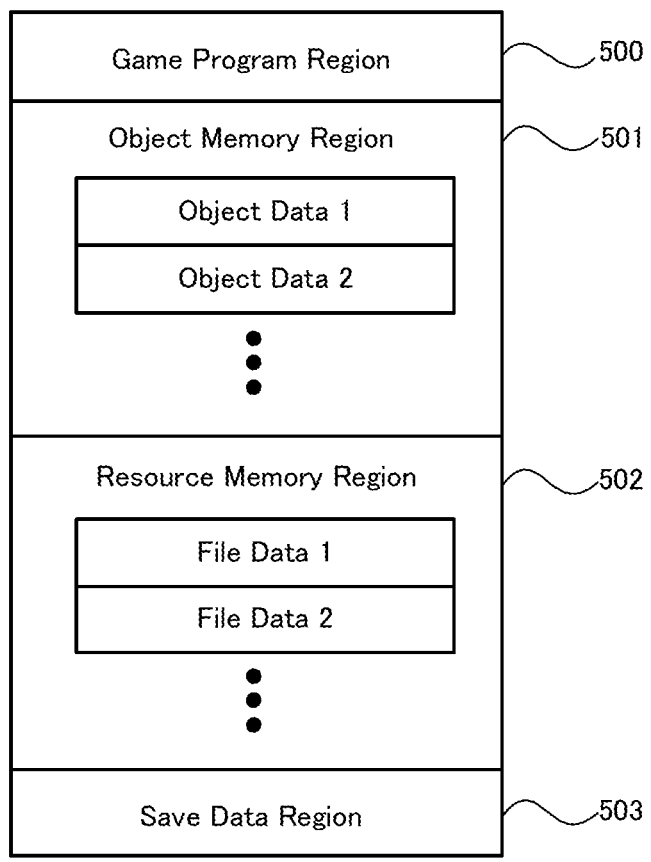
FIG. 3 is a diagram illustrating various types of data used in game processing.

First, the various types of data used in the game processing executed by the above-described game device 10 will be described. FIG. 3 is a diagram illustrating various types of data, stored in the main memory, used in the game processing. As illustrated in FIG. 3, a game program region 500, an object memory region 501, a resource memory region 502, and a save data region 503 are provided in the main memory 32 of the game device 10. These will be described hereinafter.

A game program for progressing through a game is stored in the game program region 500. The game program is partially or completely read from the external storage medium or the data storage internal storage medium 34 at an appropriate timing after the game device 10 has been turned on, and is stored in the main memory 32. Part of the game program (for example, a program for calculating the orientation of the housing 1) may be stored in the game device 10 in advance.

Figure 4:
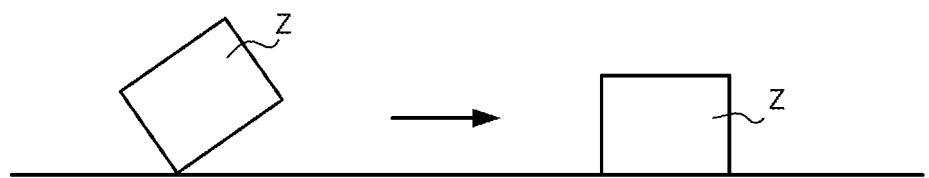
FIG. 4 is a diagram illustrating the physical behavior of an object in an unstable state.

This game program is provided with a physics engine. The physical behavior of various types of objects appearing in the game (for example, characters such as people, objects such as mountains in the background and stones, and the like) is calculated, and states such as the positions of objects are updated, by the physics engine. In other words, the physics engine calculates the physical behavior of objects on the basis of physical parameters such as the weights and shapes set for each object, environmental parameters such as the temperature, wind direction, flow of water, and so on in a virtual space in which the objects are located, and the like. For example, as illustrated in FIG. 4, assuming a parallelepiped box Z is arranged in an initial state where one side of a bottom surface is in contact with a horizontal ground surface, the physics engine will calculate a position taking the force of gravity into consideration. As a result, a downward force produced by gravity acts on the box Z, and the box Z moves so that the entire bottom surface thereof makes contact with the ground surface. Because the ground surface is horizontal, the box remains at rest on the ground surface under the effects of gravity. Results of the calculations made by the physics engine, or in other words data from after the position and so on of the object have changed, are stored in the save data region 503. However, some data may not be stored depending on the type of that data.

Data pertaining to programs necessary for generating the various types of objects is stored in the object memory region 501. Hereinafter, this data will be called object data 1, 2, 3, and so on for each of the objects. The object memory region 501 is provided in the main memory 32 by the game program.

Data pertaining to various types of files for generating objects is stored in the resource memory region 502. Hereinafter, this data will be called file data 1, 2, 3, and so on for each of the files. Each piece of file data is data expressing the shape of an object, data expressing the surface state (texture) of the object, or the like, for example. Accordingly, when generating a plurality of objects, a single piece of file data can be used for the above-described plurality of pieces of object data, for example. This data is read out from the external storage medium 4 through the external storage medium I/F 33 and loaded into the resource memory region 502, for example.

Save data expressing the progress of the game is stored in the save data region 503. For example, in the case where the game is suspended, referring to the save data makes it possible to resume the game from the state prior to the progress of the game being suspended. At least some of the save data is sequentially written into the external storage medium 4 as backup data.

Other data required by the game, such as operation data expressing player operations made in the game device 10, audio data pertaining to audio used in the game, and movie data pertaining to movies, is also stored in the main memory 32.

The present embodiment will describe the processes of the steps are flowcharts (described later) as being executed by the CPU 311. However, the processes of some of the steps in the flowcharts may be executed by a processor aside from the CPU 311, dedicated circuitry, or the like.

3. Image Processing Method for Objects in Game

Next, descriptions will be given of an image processing method for objects when playing a game using the game device 10 configured as described above.

3-1. Overview of Object Display Method

Figure 5:
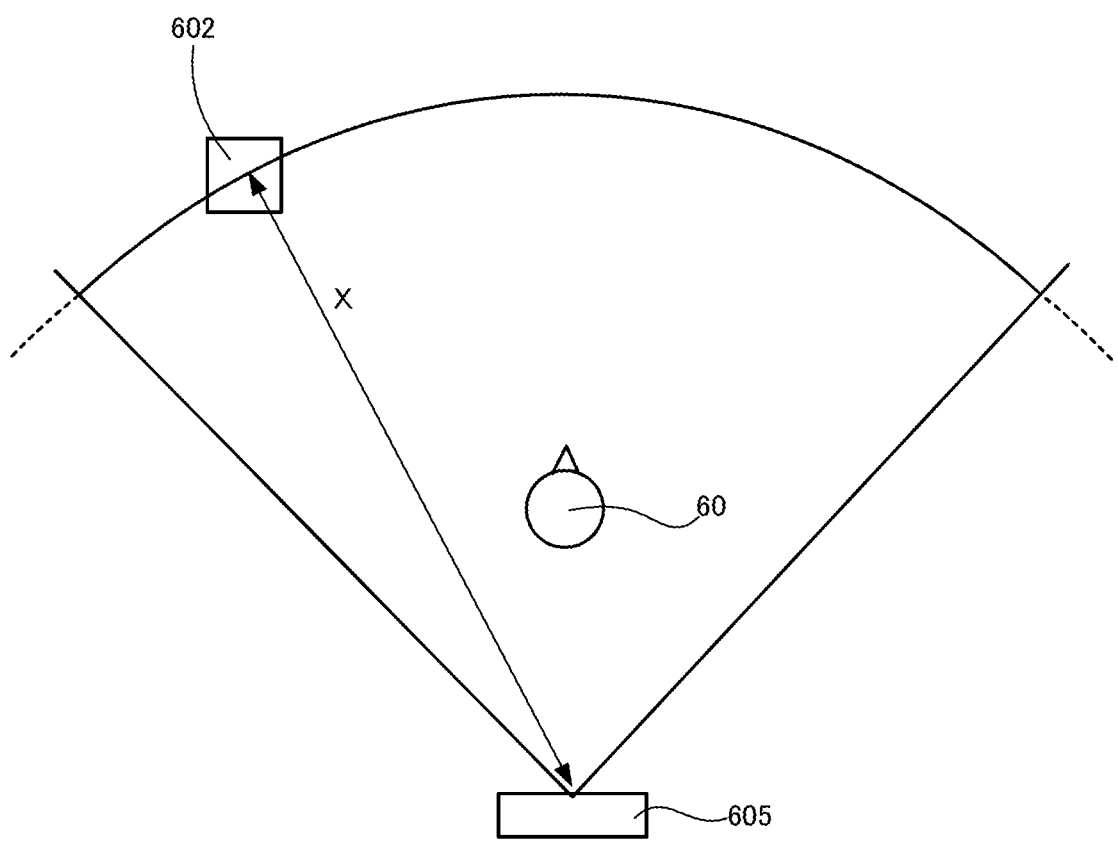
FIG. 5 is a diagram illustrating a region captured by a virtual camera in a virtual space.

As described above, the game according to the present embodiment is a role playing game, with many objects arranged in a virtual space inhabited by a player character. "Object" refers to anthropomorphic or animal characters that move, including the player character (for example, people, monsters, or the like; referred to hereinafter as "moving objects"), and objects that are still (for example, items such as boxes, natural features such as boulders and mountains, and so on; referred to hereinafter as "still objects"). Each of these objects has a radius parameter, and is rendered in the screen according to the radius parameter. To be more specific, in the game, the player character moving within the virtual space, scenery in the periphery thereof, and so on are displayed in the LCD 2 of the game device. Here, as processing for the game, a virtual camera 605 is set so as to show the virtual space in the direction a player character 60 is facing, from behind the player character 60. The virtual space shown by the virtual camera 605 is displayed in the LCD 2, as illustrated in FIG. 5. Predetermined radius parameters are set in the virtual camera 605, and objects arranged within a predetermined range from the virtual camera 605 (that is, within a predetermined radius) are displayed in the LCD 2 on the basis of the radius parameters. Accordingly, objects located further away than a predetermined distance (that is, outside the predetermined radius) from the virtual camera 605 are not displayed in the LCD 2.

In other words, as illustrated in FIG. 5, when a distance X between an initial position (or a predetermined position) of an object 602 and the virtual camera 605 in the virtual space has dropped below a distance based on the radius parameter, the object data and file data corresponding to that object 602 are loaded into the main memory 32, and the object 602 is arranged at the initial position within the virtual space. After the object 602 has been arranged in the virtual space, the object 602 is displayed in the LCD 2 at a predetermined timing. Here, a variety of settings can be employed for the timing at which the object 602 is displayed. For example, the object 602 may be displayed in the LCD 2 several frames or several seconds after the object 602 has been arranged in the virtual space, or the object 602 may be displayed in the LCD 2 at the same time as when the object 602 is arranged in the virtual space. The timing set for each object 602, from when the virtual camera 605 approaches the object 602 and the object 602 is arranged in a virtual space to when the object 602 is displayed in the LCD 2, will be referred to as a "standard timing". Note that the object 602 may be displayed immediately after the standard timing, or may, for example, be displayed gradually from a transparent or semitransparent state (fade in).

Conversely, when the player character 60 moves away from the object 602 and the distance between the virtual camera 605 and the object 602 has become greater than or equal to the radius parameter, the object 602 is no longer displayed in the LCD 2. In other words, the object data is deleted from the above-described object memory region 501. At this time, the object 602 may disappear from the LCD 2 immediately, or may, for example, gradually become transparent (fade out). In the case where the player character once again approaches an object that has already disappeared, the object data corresponding to the object 602 is loaded into the main memory 32, and the object is arranged in the virtual space, upon the distance between the object 602 and the virtual camera 605 falling below the radius parameter, as described above. The object 602 is then displayed in the LCD 2 after the standard timing.

3-2. Physical States of Objects

Of the objects described in the present embodiment, the still objects in particular have stable states and unstable states depending on their arrangements in the virtual space. For example, when a box is arranged at an angle as described above, and the behavior of that object is calculated by the physics engine, the box will be in a physically unstable state, moving and changing position, orientation, direction, and so on as time passes. "Unstable state" refers to such a state. On the other hand, "stable state" refers to a physically stable state in which the position of the object does not change as time passes, even if the behavior of the object is calculated by the physics engine. For example, in the case where the parallelepiped box is arranged on the horizontal ground surface as described above, the box will not move and is therefore in a stable state.

Figure 6:
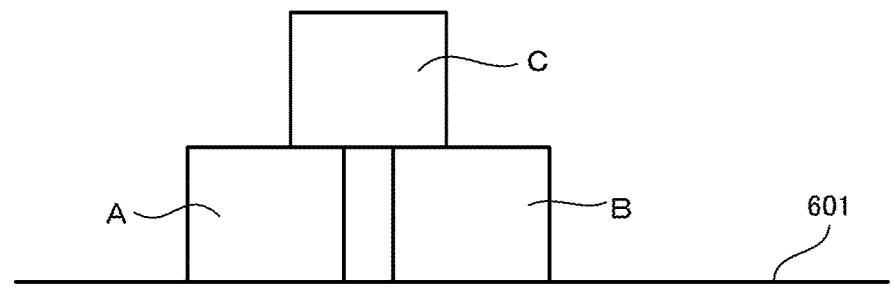
FIG. 6 is a diagram illustrating the physical behavior of objects in a stacked state.
Figure 7:
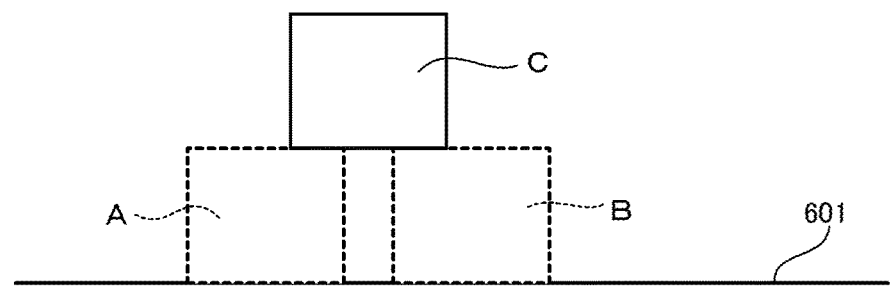
FIG. 7 is a diagram illustrating the physical behavior of objects in a stacked state.
Figure 8:
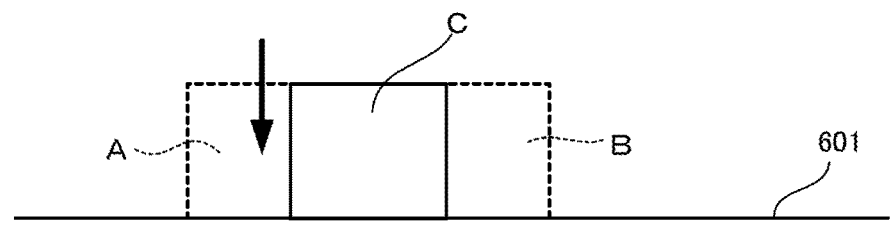
FIG. 8 is a diagram illustrating the physical behavior of objects in a stacked state.

An unstable state can also occur in situations such as the following. For example, assume that three parallelepiped boxes A to C are stacked upon a ground surface 601 of the virtual space in an initial state, as illustrated in FIG. 6. More specifically, the boxes A and B (supporting objects) are arranged adjacent to each other on the ground surface 601, and the box C is arranged so as to span the top surfaces of the boxes A and B. In this state, assume that as the game progresses, the boxes A and B are, for example, broken by an anthropomorphic object or the like in the virtual space, as illustrated in FIG. 7. In this case, the boxes below the box C are no longer present, and thus the physics engine performs calculations such that the box C drops down onto the ground surface 601 due to the effects of gravity, as illustrated in FIG. 8. The behavior of the box C based on these calculations (the dropping action) is displayed in the LCD 2. At this time, the state illustrated in FIG. 7, where no other boxes are arranged below the box C, corresponds to an unstable state, whereas the state in which the box C has dropped down onto the ground surface corresponds to a stable state.

Thus in the case where the boxes A and B have been broken during the game, in the present embodiment, the boxes A and B having been broken is stored in the save data region 503, but the box C dropping down thereafter is not stored in the save data region 503. As such, only the box C being in the initial position, illustrated in FIG. 7, is stored in the main memory 32, and thus the box C will be floating in midair once the boxes A and B are no longer present.

Assume that, for example, after the boxes A and B have been broken, the virtual camera 605 moves away from the box C by greater than or equal to the distance based on the radius parameter and the box C is no longer shown by the virtual camera 605. When the virtual camera 605 then approaches the box C again and the distance from the box C once again falls within the distance based on the radius parameter, the following behavior will be displayed in LCD 2. After the box C is arranged in the virtual space, and is then to be displayed in the LCD 2 on the basis of the above-described standard timing, there is a risk that the box C will first be displayed in the LCD 2 as floating in midair as illustrated in FIG. 7, but will then be displayed as dropping downward due to the physics engine. This unnatural behavior of the box C in the unstable state will be visible to the player.

Figure 9:
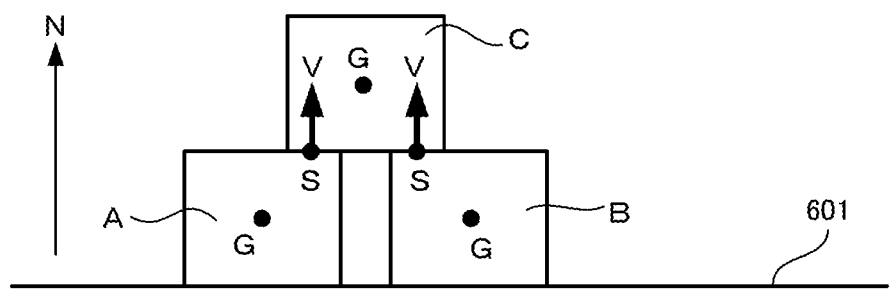
FIG. 9 is a diagram illustrating conditions of a stacked state.

Stacked states of objects in which an unstable state such as that described above can arise will be described next. A stacked state can be set as a state that satisfies the following conditions (1) to (3), for example. This will be described with reference to FIGS. 9 to 11.

(1) A center of gravity G of the target object (the box C) is higher than centers of gravity G of supporting objects that support the target object (the boxes A and B).

Figure 10:
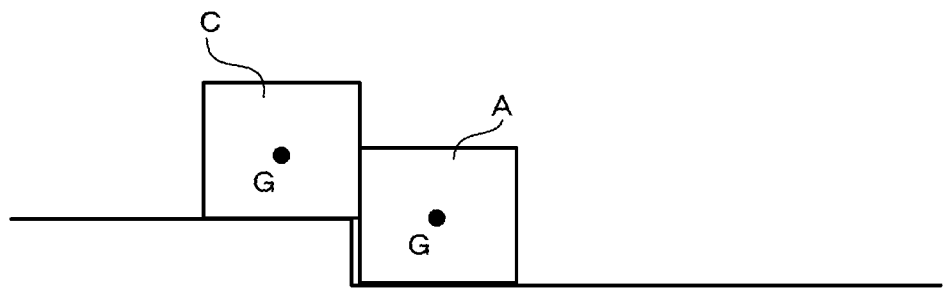
FIG. 10 is a diagram illustrating conditions of a stacked state.

(2) The target object (the box C) and the supporting objects (the boxes A and B) are in contact with each other, with normal lines V facing upward from the points of contact S extend within a predetermined angle (within 15°, for example) of a vertical direction N. According to this condition, for example, an object having a center of gravity lower than the center of gravity of the target object but that only makes contact with the side surface of the target object, as illustrated in FIG. 10, does not serve as a supporting object, and thus does not satisfy condition (2) with respect to the target object.

Figure 11:
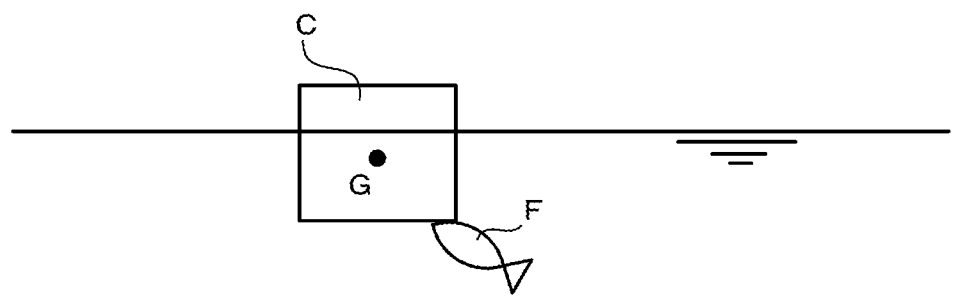
FIG. 11 is a diagram illustrating conditions of a stacked state.

(3) The object below the target object does not itself move. For example, as illustrated in FIG. 11, in the case where the other object is a fish F moving in water and the fish F happens to make contact with the bottom surface of the target object floating in the water, the object that is the fish F is not a supporting object and thus does not satisfy condition (3).

However, these conditions (1) to (3) are merely examples of stacked states, and other conditions may be applied as long as the target object supported by the supporting object(s) is in an unstable state upon the supporting object(s) disappearing. The objects being in the stacked states that satisfy conditions (1) to (3) is included in the game program.

3.3 Image Processing for Object in Unstable State

Figure 12:
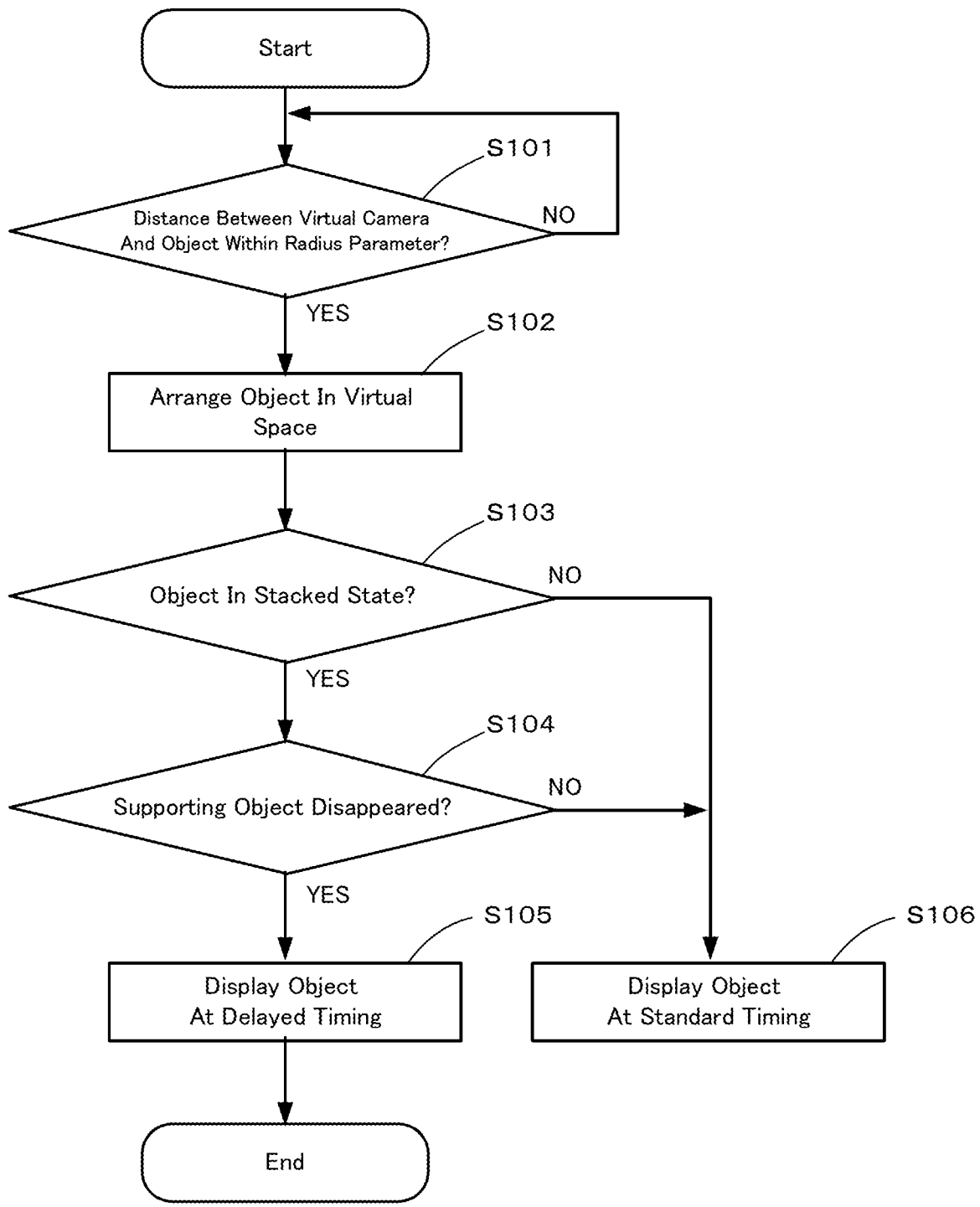
FIG. 12 is a flowchart illustrating image processing carried out on an object in an unstable state.

As described above, in the case where a supporting object has disappeared, the target object will be in an unstable state, and there is a risk that when the target object is once again shown by the virtual camera 605, the behavior of moving from the unstable state to the stable state will be displayed in the LCD 2. Accordingly, in the present embodiment, image processing such as that illustrated in the flowchart of FIG. 12 is carried out on the object in the unstable state. As illustrated in FIG. 12, first, when the virtual camera 605 comes within the distance from the target object based on the radius parameter (YES in step S101), the object is arranged in the virtual space (step S102). The target object is not yet displayed in the LCD 2 at this time.

Next, it is determined whether or not the target object is in a stacked state satisfying the above-described conditions (1) to (3) in the initial state of the target object (step S103). In the case where the target object is in a stacked state (YES in step S103), it is determined whether or not the supporting object(s) have disappeared due to being broken or the like (step S104). In the case where the supporting object (s) have disappeared (YES in step S104), the target object is in the unstable state, and is thus displayed in the LCD 2 at a timing, after the physical behavior has been calculated by the physics engine, that is later than the above-described standard timing (step S105). The timing that is "later" than the standard timing can be, for example, a timing that is approximately two seconds later than the standard timing. On the other hand, in the case where the target object is not in a stacked state (NO in step S103) or the supporting object(s) have not disappeared (NO in step S104), the target object is displayed in the LCD 2 at the standard timing (step S106).

Displaying the target object at a timing later than the standard timing (called a "delayed timing" hereinafter) in this manner makes it possible to display the target object in the LCD 2 after the physics engine has calculated the physical behavior for the target object. In other words, the target object in the unstable state can be dropped down, arranged on the ground surface in the stable state, and then displayed in the LCD 2. The player will view the target object in the LCD 2 after the target object is in the stable state, and can therefore progress through the game without a sense of unnaturalness.

4. Variations

An embodiment of the present invention has been described thus far. However, the present invention is not intended to be limited to the above-described embodiment. Many variations can be made thereon without departing from the essential spirit of the present invention. The following variations are possible, for example. The following variations can also be combined as appropriate.

4-1

In the above-described embodiment, when an object is in a stacked state satisfying conditions (1) to (3) and supporting object(s) supporting that object disappear, the configuration is such that the target object is in the unstable state. However, whether or not the target object will be in an unstable state in the case where the objects supporting the target object disappear may be calculated by the physics engine regardless of such conditions, and the delayed timing may then be applied in the case where the calculations indicate that the target object will be in an unstable state.

4-2

The foregoing embodiment describes a case where the target object is in a stacked state as an example of an unstable state for an object for which the delayed timing is applied. However, this is only one example of an unstable state for which the delayed timing is applied, and the delayed timing can be applied in other cases as well. For example, the delayed timing is also applied in the case where a moving object is arranged upon the still object in a stacked state and the still object is broken, disappears, or moves and thus is no longer present underneath the moving object. Additionally, in the case where a plurality of still objects are arranged in a sloped direction on a sloped surface and a lower object is broken, disappears, or moves and thus is no longer present underneath a higher object, the higher object moves down the sloped surface on the basis of the calculations made by the physics engine.

Additionally, depending on the relationship with the target object, the delayed timing is employed not only in the case where another object has disappeared or the like, but also in the case where the target object is determined to be in an unstable state on the basis of the calculations made by the physics engine. For example, it is conceivable that changes in the environment in the virtual space will cause the target object to be in an unstable state. In the case where a target object that was in a stable state is now in an unstable state and is once again shown by the virtual camera, there is a risk that the behavior of the target object changing from the unstable state to the stable state will be displayed in LCD 2 if the standard timing is employed. In this case, the delayed timing can be employed.

4-3

Rather than using a single delayed timing, the delayed timing can be set as appropriate on an object-by-object basis. Likewise, rather than using a single standard timing, the standard timing can be set as appropriate on an object-by-object basis.

4-4

In the foregoing embodiment, the radius parameter is set for the virtual camera, and the object is arranged in the virtual space upon the distance between the virtual camera and the object falling below a distance based on the radius parameter. However, a plurality of radius parameters can be set. The plurality of parameters can be set as a close range from the virtual camera, a far range from the virtual camera, or in consideration of the orientation of the virtual camera. Additionally, the arrangement of the objects in the virtual space may be set on an object-by-object basis. Furthermore, the conditions for arranging an object in the virtual space are not limited to the radius parameter, and a variety of parameters based on the distance between the virtual camera and the object can be employed. Conditions aside from the distance, such as the orientation of the virtual camera, can also be taken into consideration.

4-5

Although the image processing program and the image processing method according to the present invention are applied in a game, the present invention is not limited thereto. In other words, in addition to games, the present invention can be applied in various types of applications the display objects in a virtual space using a virtual camera (certain simulations or the like).

4-6

The foregoing embodiment describes an example of a game device, but the present invention is not limited thereto. In other words, the game device is not particularly limited as long as the game device can execute the above-described game program. As such, the present invention can be applied in a variety of information processing apparatuses, such as a proprietary portable game terminal having an LCD, a portable terminal having LCD such as a smart phone, a proprietary stationary game device that does not have an LCD but is instead connected to an external display device, a personal computer, and the like.

B. Game Development System

Figure 13:
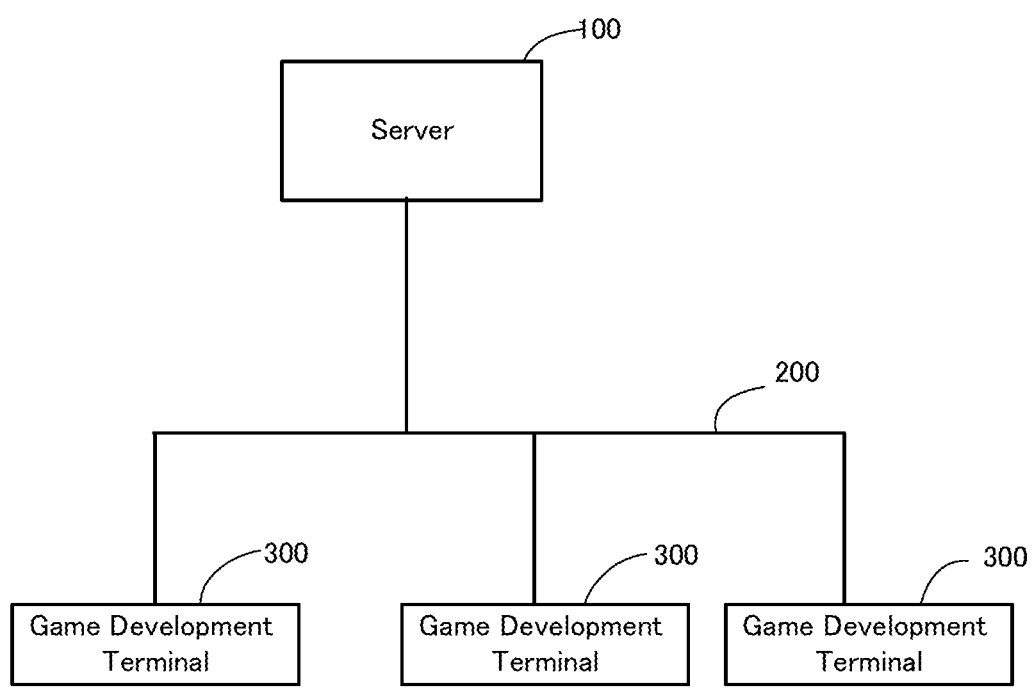
FIG. 13 is a block diagram illustrating an embodiment of a game development system.

An embodiment in which the information processing system according to the present invention is applied in a game development system will be described hereinafter with reference to the drawings. FIG. 13 is a block diagram illustrating the game development system.

1. Overview of Game Development System

As illustrated in FIG. 13, the game development system according to the present embodiment includes a server 100 storing various types of data such as game programs and the like, and a plurality of game development terminals 300 capable of communicating with the server 100 over a network 200. Aside from the internet, the network 200 may be an intranet at a development business, or a private network for communicating with an external associated company, for example. In the system, a game developer develops a game using the game development terminal 300. At this time, the necessary game data and the like is downloaded from the server 100, and various development tasks such as editing the game data are then carried out. Once the development tasks are complete, the game data is sent to the server 100 so as to update the game data. The server 100 and the game development terminals 300 will be described in detail below.

2. Server

Figure 14:
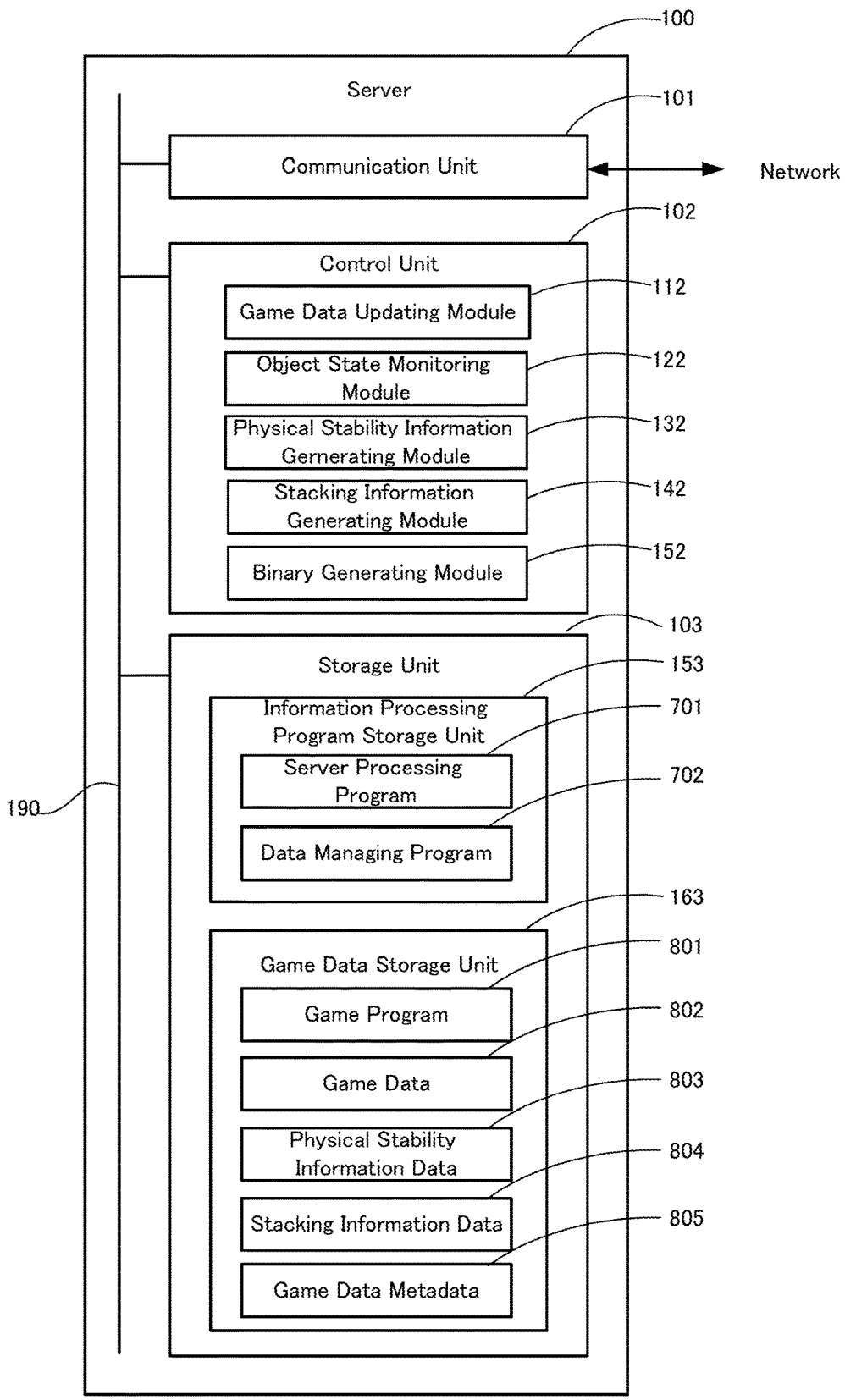
FIG. 14 is a block diagram illustrating the configuration of a server illustrated in FIG. 13.

First, the server 100 will be described with reference to FIG. 14. FIG. 14 is a block diagram illustrating an example of the configuration of the server 100 according to the present embodiment.

As illustrated in FIG. 14, the server 100 includes a communication unit 101, a controller 102, and a storage unit (storage medium) 103 connected to each other by a bus 190. The communication unit 101 is constituted of a predetermined communication module, and exchanges data with the game development terminal 300 over the network 200.

The controller 102 is constituted primarily of a CPU, RAM (memory), ROM, and soon. Various types of information processing are carried out by the controller 102 executing programs (collectively means an information processing program) stored in the storage unit 103. By executing such programs, the controller 102 according to the present embodiment functions virtually as a game data updating module 112, an object state monitoring module 122, a physical stability information generating module 132, a stacking information generating module 142, and a binary generating module 152. These functional configurations will be described later. Additionally, the controller 102 carries out general information processing for operating as the server 100, such as exchanging data with the game development terminals 300, for example.

The storage unit 103 can be constituted of a known storage device such as an HDD, an SSD, or the like, and includes an information processing program storage unit 153 storing programs and the like pertaining to the operation of the server 100, and a game data storage unit 163 storing a game program 801 and the like.

The information processing program storage unit 153 includes a server processing program 701 for operating the server 100, and a data management program 702 for managing (updating and so on) game data 802, which will be described later. The game data storage unit 163 also includes the game program 801 under development, as well as the game data 802, physical stability information data 803, stacking information data 804, and game data metadata 805 used for that game. In addition to game data directly used in the game, the game data 802 also includes data for creating the game data. This refers to data pertaining to objects, map data in which the arrangement of the objects in a virtual space is set, and so on.
The physical stability information data 803 and the stacking information data 804 will be described later. The metadata 805 includes data connections, progress IDs, and so on. Development tools are also included in the game executed using the game program 801. For example, game data belonging to objects can be displayed, as will be described later.

In addition to various components used in game development, the server 100 can also include input units such as a keyboard, a mouse, a touch panel, and the like as interfaces for a server administrator to make inputs, a display, and output unit such as a printer, and so on.

A predetermined login process can be carried out when exchanging data with the server 100 over the network 200. In this case, an authentication process that determines whether or not a user attempting to log into the server 100 is a registered user may be carried out, or an authentication process that determines whether or not the game development terminal 300 attempting to connect to the server 100 is registered may be carried out.

Additionally, the server 100 may be constituted by a single device or a plurality of devices, and the above-described elements may be divided up amongst a plurality of devices as well.

3. Game Development Terminal

Figure 15:
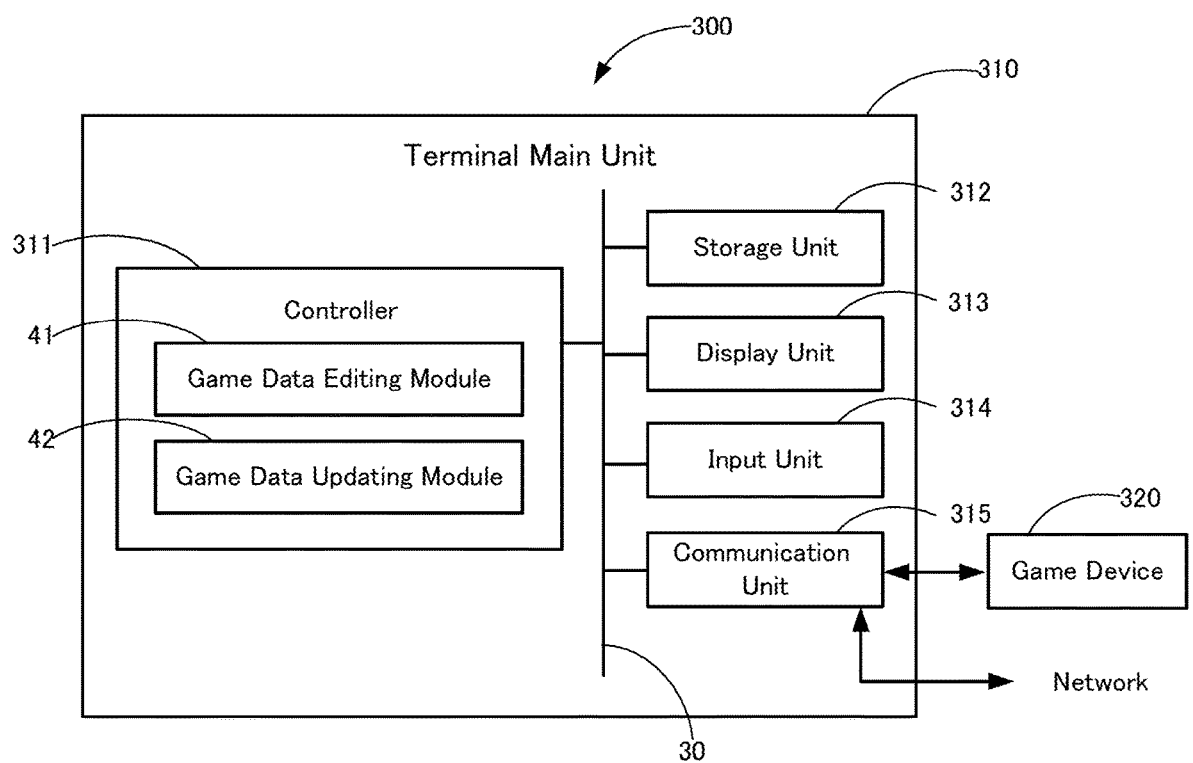
FIG. 15 is a block diagram illustrating the configuration of a game development terminal illustrated in FIG. 13.

Next, the game development terminal 300 will be described with reference to FIG. 15. FIG. 15 is a block diagram illustrating an example of the configuration of the game development terminal 300 according to the present embodiment.

As illustrated in FIG. 15, the game development terminal 300 includes a terminal main unit 310, and a game device 320 that is connected to the terminal main unit 310 and that executes the game being developed.

The terminal main unit 310 will be described first. As illustrated in FIG. 15, the terminal main unit 310 can be constituted by a known personal computer, for example. The terminal main unit 310 includes a controller 311, a storage unit 312, a display unit 313, an input unit 314, and a communication unit 315, which are connected to each other by a bus 30.

The controller 311 is constituted primarily of a CPU, RAM, ROM, and so on. The storage unit 312 can be constituted of a known storage device such as an HDD, an SSD, or the like, and stores various types of data used by the controller 311 to carry out the above-described game development. For example, various types of data downloaded from the above-described server 100, such as the data management program 702, the game program 801, and the game data 802, are stored in the storage unit 312.

When the controller 311 executes the data management program 702 stored in the storage unit 312, the controller 311 functions virtually as a game data editing module 41 and a game data updating module 42. These functional configurations will be described later.

The display unit 313 is constituted by a display device such as an LCD, and displays images in accordance with instructions from the controller 311. In the case where the terminal main unit 310 is constituted by a personal computer, for example, the display unit 313 may be a unit that is separate from the terminal main unit 310.

The input unit 314 may be any input device that can be operated by an operator such as a game developer, a person ordering tasks, or the like, and can be constituted by a keyboard, a mouse, a touch panel, or the like. In the present embodiment, it is assumed that, for example, an operation for pressing a button or the like displayed in the display unit 313 is carried out using a mouse.

The communication unit 315 is constituted of a predetermined communication module, and exchanges data with the server 100 over the network 200.

The game device 320 is a dedicated game device that executes the game being developed, and is a stationary or mobile game device. In the case of a stationary game device, a display device such as an LCD is provided separately. However, in the case of a mobile game device, a display unit is integrated into the game device. However, no particular distinction is made between the two in the present embodiment, and a device that displays game images in the game device 320 is simply referred to as a "display unit". Furthermore, the game device 320 is provided with an input unit for making operations pertaining to the game. Note that the game device 320 may be provided as a unit separate from the terminal main unit 310, or may be included in the terminal main unit 310.

4. Game Development Process

A game development method using the above-described server 100 and game development terminal 300 will be described next. First, a game developer downloads data pertaining to game development, such as the data management program 702, the game program 801, and the game data 802, from the server 100, and executes those programs in the game development terminal 300. The data management program 702 differs from the game data 802 and so on in that the data management program 702 is not updated frequently as the game is being developed, and thus does not necessarily need to be downloaded each time. Accordingly, the data management program 702 may be downloaded once and stored in the game development terminal 300, or may be stored in the game development terminal 300 in advance.

4-1. Data Management Screen

Figure 16:
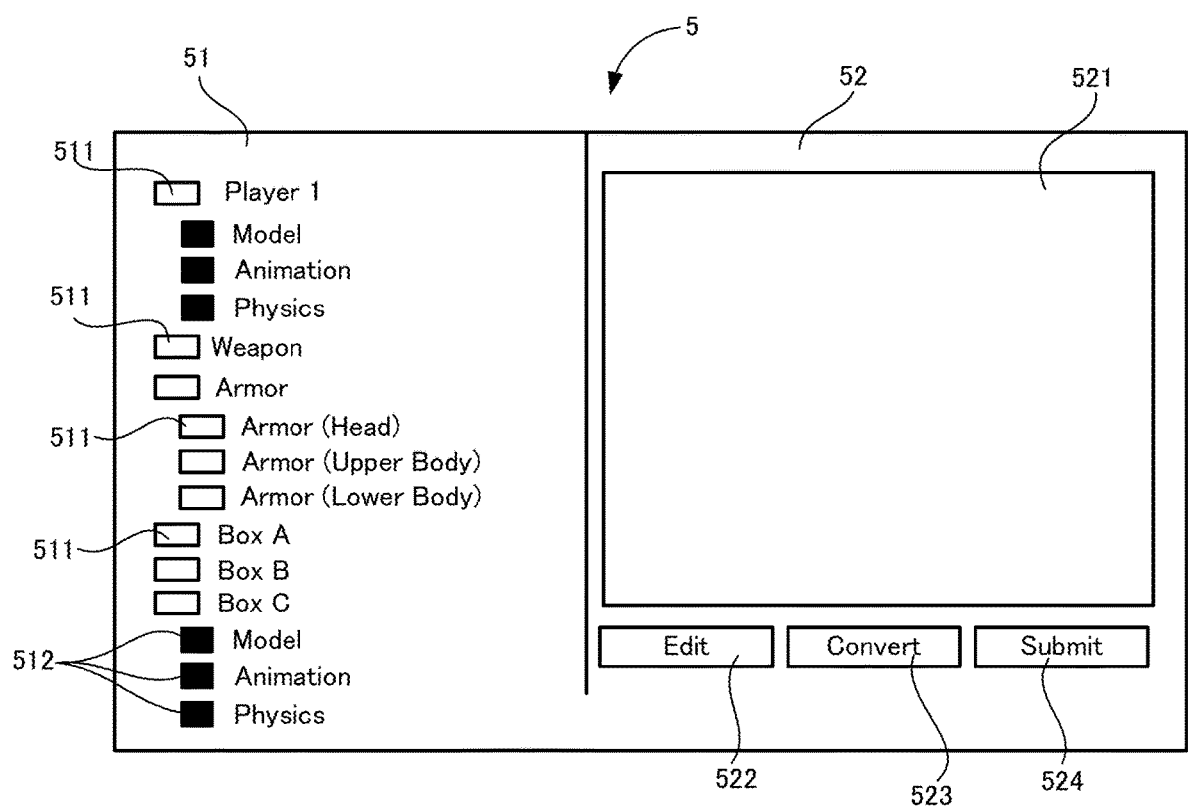
FIG. 16 is a diagram illustrating a data management screen.

FIG. 16 is a data management screen displayed when the data management program 702 is executed. As described above, when the data management program 702 is executed, a data management screen 5 is displayed in the display unit 313 of the game development terminal 300. The game data can be edited using the data management screen 5. As illustrated in FIG. 16, the data management screen 5 is divided into two regions on the left and right. A first region 51 displaying a list of game data is displayed on the left side, and a second region 52 in which the game data is edited is displayed on the right side.

A list of objects appearing in the game and game data pertaining to those objects is displayed in the first region 51. The objects displayed in the list are as described above, but in addition to objects having specific shapes, events occurring in the game (for example, battle scenes, riots, and so on) also serve as objects. Such objects are classified into a hierarchical structure and displayed in the first region 51.

In the example illustrated in FIG. 16, a character "player 1", "weapon", "armor", and "boxes" are displayed as classes of objects higher in the hierarchical structure. "Head", "upper body", and "lower body" are displayed as classifications of armor lower in the hierarchical structure. The lowest classification corresponds to the specific object, and game data is provided for these objects. For example, three pieces of game data, namely "model", "animation", and "physics", are provided for the player 1. "Model" is data expressing the shape and so on of the object, whereas "animation" is data for animating the object expressed by the model. "Physics" is data primarily expressing the physical properties of the object, and expresses a weight, a velocity, and so on, for example. However, the game data is not limited thereto, and can be set as appropriate in accordance with the object.

The second region 52 will be described next. As illustrated in FIG. 16, the second region 52 displays tools for editing the game data. Specifically, an editing screen 521, an edit button 522, a convert button 523, and a submit button 524 are arranged here. A game data editing method will be described in detail later.

Additionally, although not illustrated in FIG. 16, settings such as the initial position, direction, orientation, and so on of each object arranged within the virtual space, or in other words, map data included in the game data 802, may be edited in the data management screen 5, or may be edited using a different management tool.

4-2. Game Data Editing

Next, the editing of the game data will be described with reference to the flowchart in FIG. 17. First, the game data to be edited is selected from among the game data displayed in the first region 51 (step S201), and when the edit button 522 is then pressed, the editing screen 521 based on the selected game data is displayed in the second region 52.

For example, if "physics" game data for the box A, which is an object displayed in the first region 51, is selected, parameters pertaining to the box A, such as a weight, are displayed in the editing screen 521. The game developer can then carry out editing tasks such as modifying, adding, and deleting parameters displayed in the editing screen 521 (step S202). An editing screen based on the selected game data is displayed in the editing screen 521 in this manner. Accordingly, in the case where other game data has been selected, the editing screen 521 is displayed having different parameters and so on from those displayed for the box A. The foregoing editing tasks are carried out by the game data editing module 41 of the controller 311.

When the editing of the game data using the editing screen 521 or a dedicated application is complete, the game developer presses the convert button 523 to confirm the completion of the editing. The game data downloaded to the game development terminal 300 is updated in response to this operation (step S203). Next, the game program is executed in response to an instruction from the game developer, in order to confirm the effects of the updated game data. A game into which the updated game data has been incorporated is then started (step S204). In other words, a game screen is displayed in the display unit of the game device 320 provided in the game development terminal 300. The game developer then causes the objects pertaining to the edited game data to be displayed in order to confirm the effects of the editing (step S205). In the case where confirming the effects of the editing indicates that additional editing is necessary (YES in step S206), the game data is edited again in the manner indicated in steps S202 to S205. Although these processes are executed on the basis of instruction operations made by the game developer, processes not necessary in the editing tasks need not be instructed, and may not be executed. For example, in the case of a task where confirming the effects is unnecessary, the processes of steps S204 and S205 may be omitted.

In the case where the effects of the editing have been confirmed and the editing is complete (NO in step S206), the game developer presses the submit button 524. In response to this operation, the edited game data is applied to the game data 802 stored in the server 100 (step S207). In other words, the game data 802 stored in the server 100 is updated. Accordingly, all of the game development terminals 300 connected to the server 100 can view the updated game data 802 and the objects pertaining to the game data 802, and can also edit that data. The foregoing updating tasks are carried out by the game data updating module 42 of the controller 311. Note that it is only necessary to hold data, of the data used by the game developer, that is used in the game as the game data 802. Data necessary for the game developer to generate and edit game data but that is not used in the game, such as 3D model data having a higher level of detail than that used in the game, high-resolution textures, or data that was not employed but that may be used during corrections need not be held in the server 100, and may instead be held only in the game development terminal 300 used by the game developer.

Figure 17:
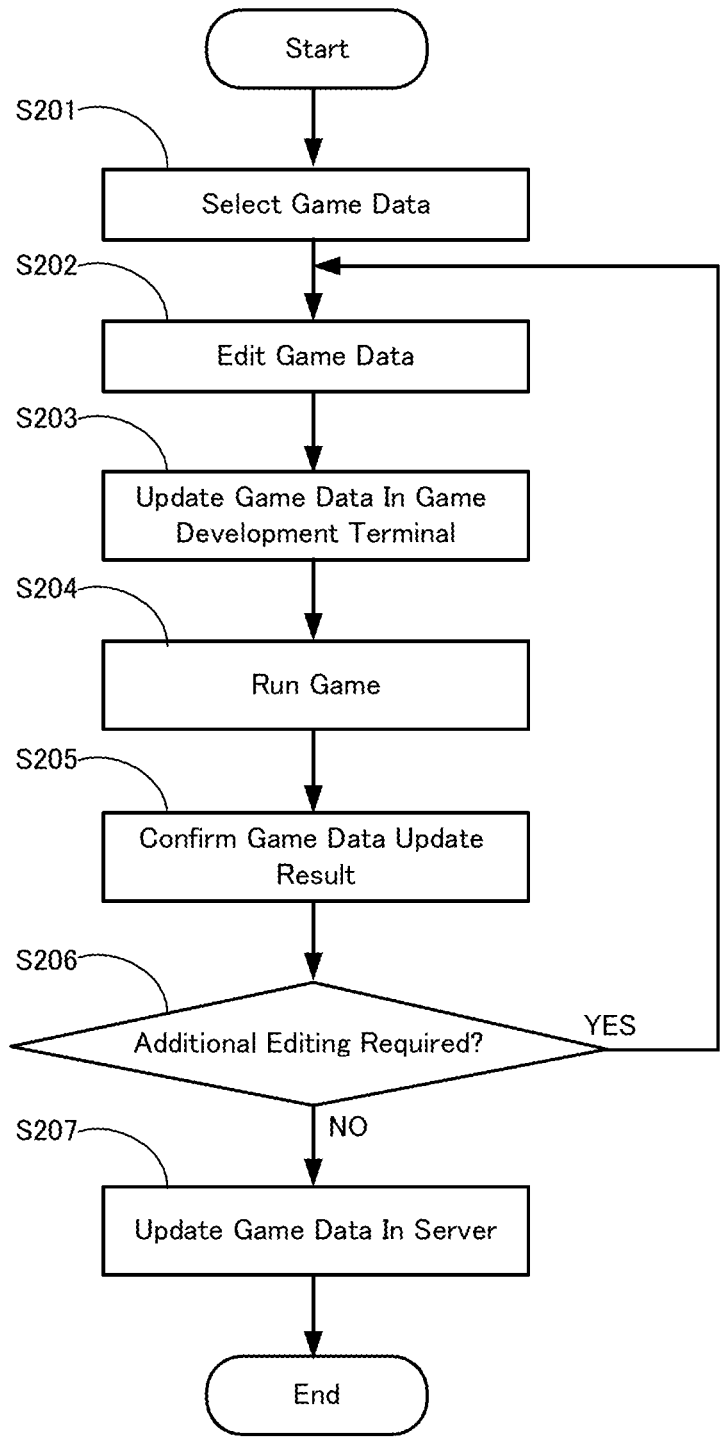
FIG. 17 is a flowchart illustrating a game data editing process.

Additionally, although not illustrated in FIG. 17, the editing and updating of the map data included in the game data 802 can be carried out in the same manner.

4-3. Object Inspection Process

An object inspection process will be described next. As described in the "game device" section, in the case where objects are in a stacked state and the supporting object(s)

disappear, the object arranged thereon will be in an unstable state. As described above, the delayed timing is used to adjust the timing at which the target object is displayed in such a case. To do so, it is necessary to store, in advance, which objects in the virtual space are in a stacked state.

When developing a game, all of the objects are not constantly arranged in the virtual space in a stable state. Rather, objects may be arranged in an unstable state when in their initial states. If objects in an unstable state remain in this manner, the same problem as with the stacked state may arise. In other words, when an object in an unstable state is arranged in the virtual space and is displayed at the standard timing, the physical behavior is calculated by the physics engine so that the object is in a stable state, and the behavior of the object is displayed in the LCD 2 on the basis of those calculations. The object will therefore be displayed in the LCD 2 at the same time as the behavior of the object changes from an unstable state to a stable state, which will appear unnatural to the player.

Thus in the system according to the present embodiment, the game data 802 stored in the server 100 is scanned at the game development stage, and the physical states of all of the objects are detected. Any objects in an unstable state are corrected to being in a stable state, and the physical stability information data 803 is generated when all of the objects are in a stable state. If an object is in a stacked state, that is stored as the stacking information data 804. By carrying out the processing for scanning the game data 802 automatically, for example at night when game development tasks are not underway, the tasks can be made more efficient. This processing will be referred to as an "object inspection process" hereinafter.

4-3-1. Generating Physical Stability Information Data

In the inspection process, the object state monitoring module 122 of the controller 102 scans all of the objects in the map data of the game data, and carries out a simulation for all of the objects using the physics engine. Specifically, binary data is generated by converting the map data, and the game is run by executing the binary data using the game device. The physical behavior of each object is then simulated in the virtual space of the game using the physics engine. When the result of the simulation indicates that an object is in a stable state, that stable state is stored as the state of the object. For example, an object that is originally in a stable state remains in a stable state even when the simulation is carried out, and thus the state of the object (the position, direction, orientation, and so on, for example) does not change.

On the other hand, an object that is originally arranged in an unstable state, as illustrated in FIG. 4, exhibits behavior of moving to a physically stable state in the simulation. Accordingly, in the present embodiment, the system stands by for a set amount of time for an object in an unstable state to move to a stable state in the simulation. The state of the object that is now in the stable state is taken as the physical stability information data 803, associated with the data pertaining to that object, and stored in a game data storage unit 163. For example, an SRT matrix of the object now in a stable state can be stored. In this manner, simulations are carried out for all of the objects while moving through the virtual space, and the above-described physical stability information generating module 132 of the controller 102 generates the physical stability information data 803.

4-3-2. Generating Stacking Information Data

In the inspection process, the object state monitoring module 122 of the controller 102 scans all the objects in the game data, and searches out objects that satisfy the above-described stacked state conditions (1) to (3). In other words, in the same manner as described above, the game is run by executing binary data in the game device, and objects satisfying conditions (1) to (3) in the virtual space are searched out in order. When an object satisfying these conditions is found, the stacking information generating module 142 of the controller 102 stores that object being in the stacked state as the stacking information data 804 in the game data storage unit 163, in association with the data pertaining to that object.

4-3-3. Generating Binary Data

Figure 18:
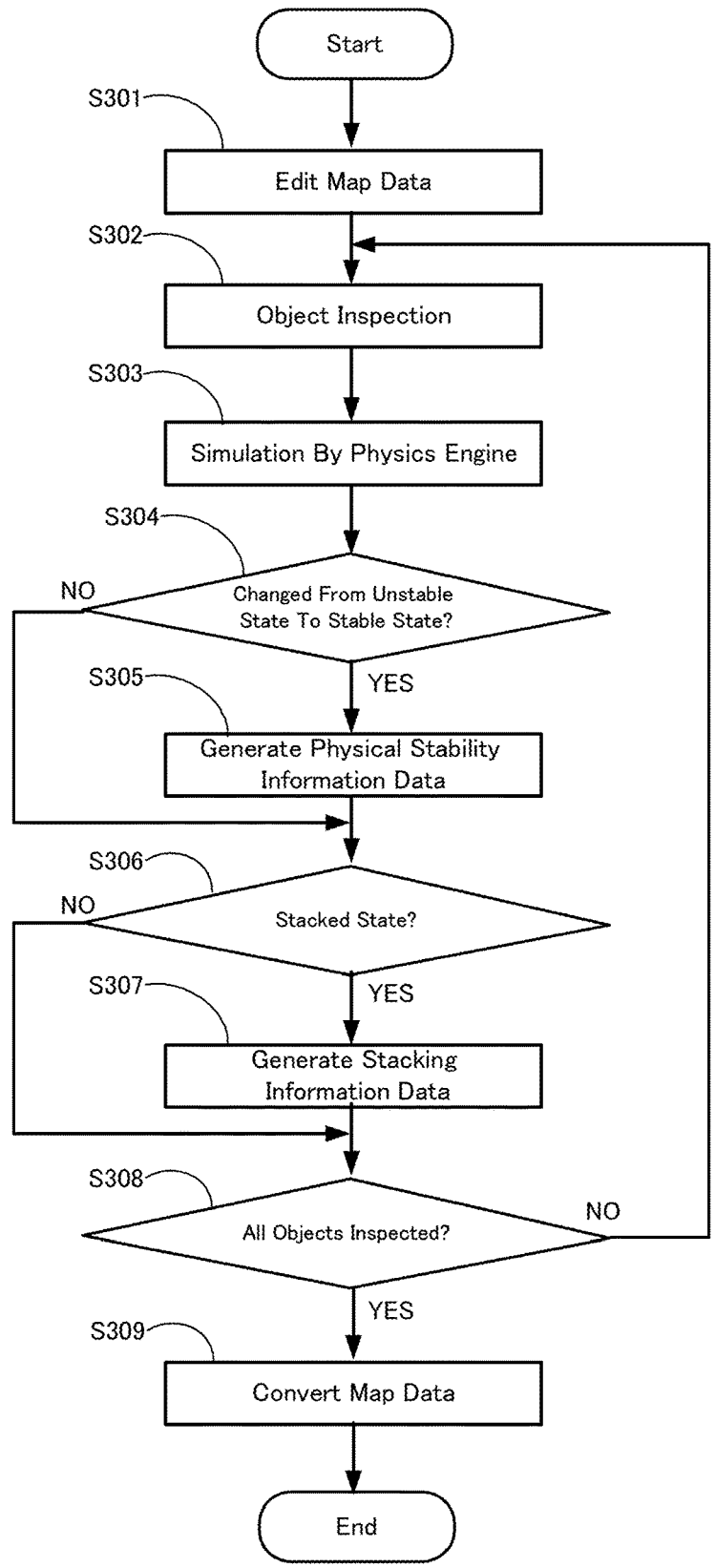
FIG. 18 is a flowchart illustrating the conversion of game data.

The process of generating binary data through conversion from the game data (map data) will be described next with reference to the flowchart in FIG. 18.

First, the game data (including the map data) is developed and edited each day by the game developer (step S301). When the game data is not being edited or updated, such as at night, the object state monitoring module 122 inspects the objects (step S302). In other words, the game is run by executing pre-correction binary data, and the objects arranged in the virtual space are searched out. Then, the physics engine carries out simulations for the objects (step S303), and in the case where an object in an unstable state has moved to a stable state (YES in step S304), the physical stability information generating module 132 generates the physical stability information data 803 for that object (step S305).

In the case where an object in a stacked state is found during the inspection process (YES in step S306), the stacking information generating module 142 generates the stacking information data 804 in association with that object (step S307).

Once the inspection is completed for all of the objects within the virtual space (YES in step S308), and the physical stability information data 803 and the stacking information data 804 have been generated, the binary data is generated by converting the map data using the physical stability information data 803 and the stacking information data 804 (step S309). This conversion is carried out by the binary generating module 152 of the controller 102. Specifically, the conversion is carried out so that for an object in an unstable state, the initial position, orientation, direction, and so on are corrected on the basis of the physical stability information data 803 to bring the object into a stable state. For an object in a stacked state, the conversion is carried out having associated the stacking information data 804 with the data pertaining to the object. A game run using the corrected binary data created in this manner eliminates objects in an unstable state from the beginning. Additionally, it is known in advance which objects are in a stacked state, and thus the above-described delayed timing can be applied immediately. The inspection process described above can be carried out at a frequency suitable for the state of the game development, such as once a day.

5. Variations

An embodiment of the present invention has been described thus far. However, the present invention is not intended to be limited to the above-described embodiment. Many variations can be made thereon without departing from the essential spirit of the present invention. The following variations are possible, for example. The following variations can also be combined as appropriate.

5-1

In the above embodiment, the physical stability information data 803 and the stacking information data 804 are generated in the object inspection process, but it is also possible to generate only one of these pieces of data.

5-2

In the above embodiment, the game data (map data) is converted using the physical stability information data 803 and the stacking information data 804, but the game data can be directly corrected using these pieces of data.

5-3

The game data editing method according to the above embodiment is merely one example, and a variety of methods aside from that described above can be used. Accordingly, the configuration of the screen 5 described in the foregoing embodiment is merely one example, and the layout of the screen, the display items, the buttons, and so on can be changed as appropriate.

5-4

Although the information processing system according to the present invention is applied in a game development system in the foregoing embodiment, the present invention is not limited thereto, and can be applied in a variety of information processing systems for developing applications aside from games.

What is claimed is:

1. A non-transitory storage medium storing an image processing program executable by a computer of an information processing apparatus including at least one memory, the image processing program, when executed, causing a computer to execute functionality comprising:
   controlling a virtual camera in a virtual space;
   reading out, from the storage medium, an object, among objects recorded in the storage medium as objects present in the virtual space, that based on at least a distance from the virtual camera is newly selected as the virtual camera moves, holding the object in the at least one memory, and newly arranging the object in the virtual space;
   calculating physical behavior of the object in the virtual space and updating a position of the object;
   determining whether the object, when newly arranged, is in an unstable state based on the physical behavior of the object immediately after the object is arranged in the virtual space, the unstable state being a state in which the object moves;
   setting the object so as to be displayed in a manner appropriate for a predetermined timing after the object is arranged, and furthermore, in a case where the object has been determined to be in an unstable state, setting the object so as to be displayed in a manner appropriate for a timing later than the predetermined timing rather than the manner appropriate for the predetermined timing; and
   generating an image of the virtual space including the object to be displayed based on the virtual camera.

2. The storage medium according to claim 1, wherein:
   at least an initial position of each object is stored in the storage medium as information of the respective objects;
   the object is newly arranged in the virtual space in the initial position of the object; and
   the image processing program, when executed, further causes the computer to execute functionality comprising:
      changing and storing a state of the objects in the virtual space; and
      in a case where a supporting object in a positional relationship of supporting the newly-arranged object is stored in the storage medium and the supporting object is not present in the initial position when the state of the objects is changed and stored, the newly-arranged object is determined to be in the unstable state.

3. The storage medium according to claim 2, wherein:
   the image processing program, when executed, further causes the computer to execute functionality comprising controlling a player character based on an operation carried out by a player during game processing;
   in a case where a process of removing an object is carried out in the game processing, information indicating that the object has disappeared is stored; and
   in a case where the supporting object supporting the newly-arranged object has disappeared, the newly-arranged object is determined to be in the unstable state.

4. The storage medium according to claim 2, wherein the supporting object and the newly-arranged object are in a stacked state, the stacked state being a state in which the supporting object is arranged below the newly-arranged object in the virtual space and a downward physical force acts at a contact location between the supporting object and the newly-arranged object.

5. The storage medium according to claim 4, wherein the supporting object and the newly-arranged object being in the stacked state is stored in advance.

6. The storage medium according to claim 2, wherein the newly-arranged object being supported by the supporting object is stored in advance.

7. The storage medium according to claim 1, wherein the image processing program, when executed, further causes the computer to execute functionality comprising enabling a player character to interact with the object responsive to user input.

8. The storage medium according to claim 1, wherein the setting is performed in accordance with the physical behavior and the generating is performed in accordance with the setting.

9. An information processing apparatus comprising:
   at least one processor;
   at least one memory; and
   a non-transitory storage medium storing at least one image processing program, the image processing program, when executed by the at least one processor, causing performance of operations including:
      controlling a virtual camera in a virtual space;
      reading out, from the storage medium, an object, among objects recorded in the storage medium as objects present in the virtual space, that based on at least a distance from the virtual camera is newly selected as the virtual camera moves, holding the object in the at least one memory, and newly arranging the object in the virtual space;
      calculating physical behavior of the object in the virtual space and updating a position of the object;
      determining whether the object, when newly arranged, is in an unstable state based on the physical behavior of the object immediately after the object is arranged in the virtual space, the unstable state being a state in which the object moves;
      setting the object so as to be displayed in a manner appropriate for a predetermined timing after the object is newly arranged, and furthermore, in a case where the object has been determined to be in an unstable state, setting the object so as to be displayed in a manner appropriate for a timing later than the predetermined timing rather than the manner appropriate for the predetermined timing; and generating an image of the virtual space including the object to be displayed based on the virtual camera.

10. The information processing apparatus according to claim 9, wherein:

at least an initial position of each object is stored in the storage medium as information of the respective objects;

the object is newly arranged in the virtual space in the initial position of the object; and the image processing program, when executed, causes the at last one processor to perform further operations including:

changing and storing a state of the objects in the virtual space; and in a case where a supporting object in a positional relationship of supporting the newly-arranged object is stored in the storage medium and the supporting object is not present in the initial position when the state of the objects is changed and stored, the newly-arranged object is determined to be in the unstable state.

11. The information processing apparatus according to claim 10, wherein:

the image processing program, when executed, causes the at last one processor to perform further operations including controlling a player character based on an operation carried out by a player during game processing;

in a case where a process of removing an object is carried out in the game processing step, information indicating that the object has disappeared is stored; and in a case where the supporting object supporting the newly-arranged object has disappeared, the newly-arranged object is determined to be in the unstable state.

12. The information processing apparatus according to claim 10, wherein the supporting object and the newly-arranged object are in a stacked state, the stacked state being a state in which the supporting object is arranged below the newly-arranged object in the virtual space and a downward physical force acts at a contact location between the supporting object and the newly-arranged object.

13. The information processing apparatus according to claim 12, wherein the supporting object and the newly-arranged object being in the stacked state is stored in advance.

14. The information processing apparatus according to claim 10, wherein the newly-arranged object being supported by the supporting object is stored in advance.

15. An image processing method carried out by a computer of an information processing apparatus with at least one memory and a non-transitory storage medium, the method comprising:

controlling a virtual camera in a virtual space;

reading out, from the storage medium, an object, among objects recorded in the storage medium as objects present in the virtual space, that based on at least a distance from the virtual camera is newly selected as the virtual camera moves, holding the object in the at least one memory, and newly arranging the object in the virtual space;

calculating physical behavior of the object in the virtual space and updating a position of the object;

determining whether the object, when newly arranged, is in an unstable state based on the physical behavior of the object immediately after the object is arranged in the virtual space, the unstable state being a state in which the object moves;

setting the object so as to be displayed in a manner appropriate for a predetermined timing after the object is arranged, and furthermore, in a case where the object has been determined to be in an unstable state, setting the object so as to be displayed in a manner appropriate for a timing later than the predetermined timing rather than the manner appropriate for the predetermined timing; and generating an image of the virtual space including the object to be displayed based on the virtual camera.

16. The image processing method according to claim 15, wherein:

at least an initial position of each object is stored in the storage medium as information of the respective objects;

the object is newly arranged in the virtual space in the initial position of the object;

the method further comprises changing and storing a state of the objects in the virtual space; and in a case where a supporting object in a positional relationship of supporting the newly-arranged object is stored in the storage medium and the supporting object is not present in the initial position when the state of the objects is changed and stored, the newly-arranged object is determined to be in the unstable state.

17. The image processing method according to claim 16, further comprising controlling a player character based on an operation carried out by a player during game processing;

wherein in a case where a process of removing an object is carried out in the game processing, information indicating that the object has disappeared is stored; and wherein in a case where the supporting object supporting the newly-arranged object has disappeared, the newly-arranged object is determined to be in the unstable state.

18. The image processing method according to claim 16, wherein the supporting object and the newly-arranged object are in a stacked state, the stacked state being a state in which the supporting object is arranged below the newly-arranged object in the virtual space and a downward physical force acts at a contact location between the supporting object and the newly-arranged object.

19. The image processing method according to claim 18, wherein the supporting object and the newly-arranged object being in the stacked state is stored in advance.

20. The image processing method according to claim 16, wherein the newly-arranged object being supported by the supporting object is stored in advance.

21. An information processing system comprising:

at least one processor;

at least one memory; and a non-transitory storage medium storing at least one information processing program, the information processing program, when executed by the at least one processor, causing performance of operations including:

generating data of objects present in a virtual space, and for at least some of the objects arranged in the virtual space, in a case where a first object is below a second object and at least makes contact with the second object, associating information indicating that the first object is supporting the second object with the first object and the second object and storing the information in the storage medium, the information further indicating position, orientation, and direction for the second object when in an unstable state and when in each of plural stable states, wherein a change to the first object causes the second object to be moved immediately to a new position without passing through intermediate positions and in accordance with the information stored in the storage medium.

22. An information processing system comprising:
at least one processor;
at least one memory; and
a non-transitory storage medium storing at least one information processing program,
the information processing program, when executed by the at least one processor, causing performance of operations including:
generating data of objects present in a virtual space, and for at least some of the objects arranged in the virtual space, calculating physical behavior(s) thereof and updating a position of each such object until the respective object is still, updating the position of each such object that has become still, storing the updated position in the storage medium, and storing information further indicating position, orientation, and direction for each such object when in an unstable state and when in each of plural stable states, wherein a change to a first object causes a second object to be moved immediately to a new position without passing through intermediate positions and in accordance with the information stored in the storage medium.

23. The information processing system according to claim 22, wherein the at least object becomes still when reaching a stacked state, the stacked state being reached when (a) a center of gravity of the at least one object is higher than a center of gravity of each of one or more other objects that support the at least one object, (b) for each of the one or more other objects with which the at least one object makes contact, a vertically-oriented line normal to a contact location extends within a predetermined angle of a vertical direction, and (c) each of the other objects located below the at least one object does not move.

* * * * *